United States Patent
Gissen et al.

(10) Patent No.: US 10,428,805 B2
(45) Date of Patent: Oct. 1, 2019

(54) SHAPE MEMORY ALLOY ACTUATORS WITH HEAT TRANSFER STRUCTURES, ACTUATED ASSEMBLIES INCLUDING THE SHAPE MEMORY ALLOY ACTUATORS, AND METHODS OF MANUFACTURING THE SAME

(71) Applicant: The Boeing Company, Chicago, IL (US)

(72) Inventors: Abraham Naroll Gissen, Brentwood, MO (US); James Henry Mabe, Kirkwood, MO (US); Douglas E. Nicholson, Saint Louis, MO (US); Micheal A. Bass, Saint Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/265,505

(22) Filed: Sep. 14, 2016

(65) Prior Publication Data

US 2018/0073491 A1 Mar. 15, 2018

(51) Int. Cl.
*F03G 7/06* (2006.01)
*B21C 23/00* (2006.01)

(52) U.S. Cl.
CPC ............ *F03G 7/065* (2013.01); *B21C 23/002* (2013.01)

(58) Field of Classification Search
CPC ............ F03G 7/065; G01K 5/483; G12B 1/00
(Continued)

(56) References Cited

U.S. PATENT DOCUMENTS 4,700,541 A    10/1987  Gabriel et al.
5,127,228 A  *  7/1992  Swenson ................. F03G 7/065
                                                                    60/527
(Continued)

FOREIGN PATENT DOCUMENTS

CA    2910896    7/2016
EP    1130257    9/2001
(Continued)

OTHER PUBLICATIONS

Machine-generated English translation of the abstract of FR 2862353.
(Continued)

*Primary Examiner* — Mark A Laurenzi
*Assistant Examiner* — Shafiq Mian
(74) *Attorney, Agent, or Firm* — Dascenzo Intellectual Property Law, P.C.

(57) ABSTRACT

Shape memory alloy actuators with heat transfer structures, actuated assemblies including the shape memory alloy actuators, and methods of manufacturing the same are disclosed herein. The shape memory alloy actuators include a shape memory alloy torque tube and a heat transfer structure. The actuated assemblies include a base structure, an attached component, and a shape memory alloy actuator that operatively attaches the attached component to the base structure. The methods include providing a shape memory alloy torque tube, providing a heat transfer structure, applying a dimension-modifying force to the heat transfer structure, combining the heat transfer structure with the shape memory alloy torque tube, and releasing the dimension-modifying force.

22 Claims, 5 Drawing Sheets

(58) Field of Classification Search
USPC .................................................. 60/526–528
See application file for complete search history.

(56) References Cited

U.S. PATENT DOCUMENTS

| | | | |
|---|---|---|---|
| 5,150,864 A | 9/1992 | Roglin et al. | |
| 5,975,468 A | 11/1999 | Moignier et al. | |
| 6,065,934 A | 5/2000 | Jacot et al. | |
| 6,499,952 B1 | 12/2002 | Jacot et al. | |
| 7,037,076 B2* | 5/2006 | Jacot | F03G 7/065 416/155 |
| 7,810,326 B2 | 10/2010 | Taya et al. | |
| 7,878,459 B2 | 2/2011 | Mabe et al. | |
| 8,118,264 B2 | 2/2012 | Mabe et al. | |
| 8,876,046 B2 | 11/2014 | Gunter et al. | |
| 9,010,106 B2* | 4/2015 | Jardine | F03G 7/065 60/527 |
| 9,046,082 B2 | 6/2015 | Jee | |
| 9,581,146 B2* | 2/2017 | Shome | F03G 7/065 60/527 |
| 9,759,203 B2* | 9/2017 | Brown | F03G 7/06 60/527 |
| 9,897,078 B2 | 2/2018 | Nicholson et al. | |
| 2002/0185932 A1 | 12/2002 | Gummin et al. | |
| 2003/0053912 A1* | 3/2003 | Jacot | F03G 7/065 416/30 |
| 2003/0215804 A1 | 11/2003 | DeBeer et al. | |
| 2004/0261411 A1* | 12/2004 | MacGregor | F03G 7/065 60/527 |
| 2005/0210874 A1* | 9/2005 | Browne | F03G 7/065 60/527 |
| 2007/0119165 A1* | 5/2007 | Yson | F03G 7/065 60/527 |
| 2008/0227060 A1* | 9/2008 | Esashi | G09B 21/004 434/113 |
| 2009/0013684 A1* | 1/2009 | Takahashi | F03G 7/065 60/527 |
| 2009/0143730 A1 | 6/2009 | De Polo et al. | |
| 2009/0167108 A1 | 7/2009 | Yang | |
| 2009/0241537 A1* | 10/2009 | Browne | A45B 25/143 60/527 |
| 2010/0102093 A1* | 4/2010 | Ham | B05B 1/086 239/101 |
| 2010/0221124 A1* | 9/2010 | Ikushima | F04B 43/0045 417/44.2 |
| 2011/0121582 A1* | 5/2011 | Alexander | F03G 7/06 290/1 R |
| 2012/0060491 A1* | 3/2012 | Gunter | F03G 7/065 60/527 |
| 2012/0161579 A1* | 6/2012 | Browne | F15B 15/10 310/330 |
| 2012/0292155 A1 | 11/2012 | Gunter et al. | |
| 2013/0046285 A1* | 2/2013 | Griffin | A61M 25/0013 604/527 |
| 2014/0086772 A1* | 3/2014 | Olsen | F03G 7/065 417/510 |
| 2014/0331665 A1* | 11/2014 | Shivashankara | B64C 9/32 60/527 |
| 2015/0096293 A1* | 4/2015 | Shome | F03G 7/065 60/528 |
| 2015/0369223 A1* | 12/2015 | Hallila | A61B 17/66 60/527 |
| 2016/0369784 A1* | 12/2016 | Brown | F03G 7/065 |

FOREIGN PATENT DOCUMENTS

| | | |
|---|---|---|
| EP | 2484586 | 8/2012 |
| FR | 2862353 | 5/2005 |
| JP | 06249129 | 9/1994 |
| WO | WO 01/16484 | 3/2001 |

OTHER PUBLICATIONS

Machine-generated English translation of the abstract of JP 06249129.
European Patent Office, Extended European Search Report for related European Application No. 17181743, dated Jan. 23, 2018.

* cited by examiner

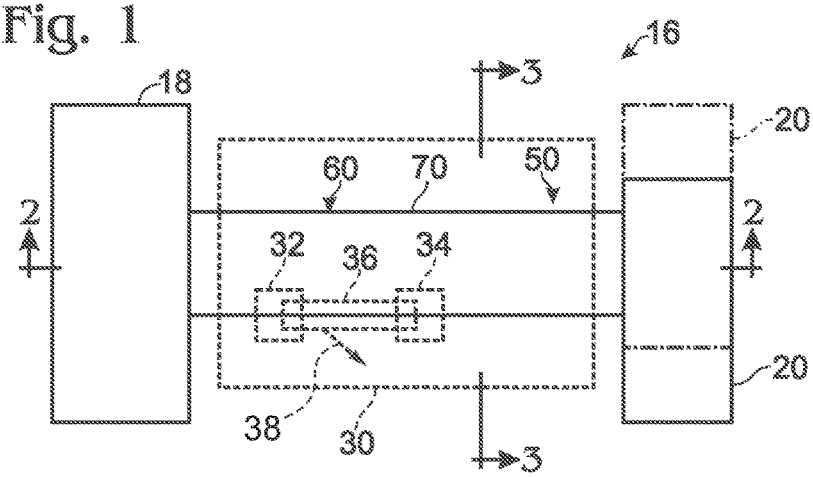
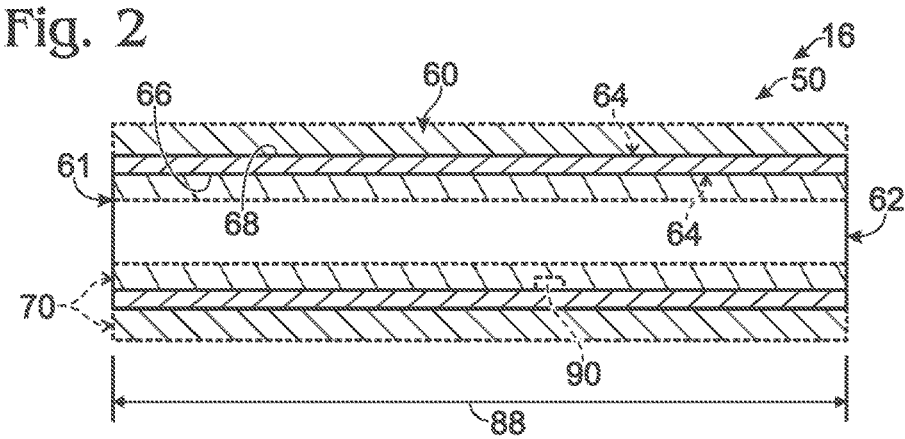
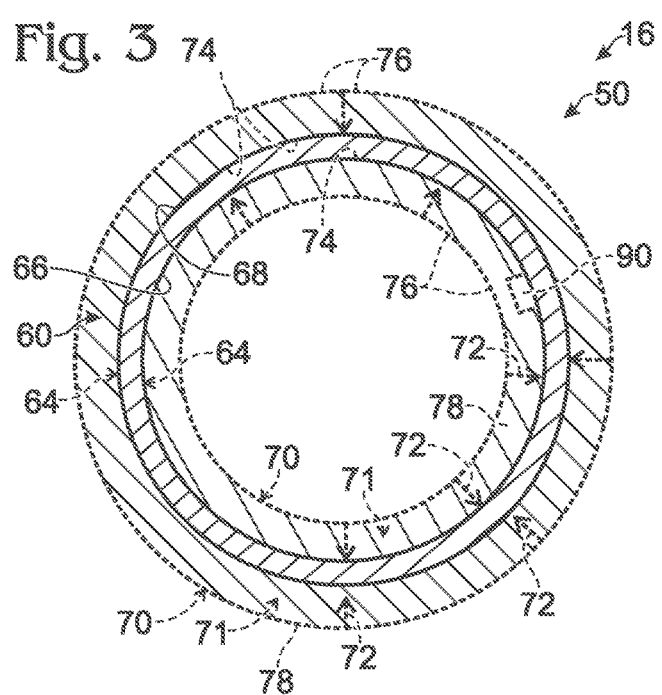

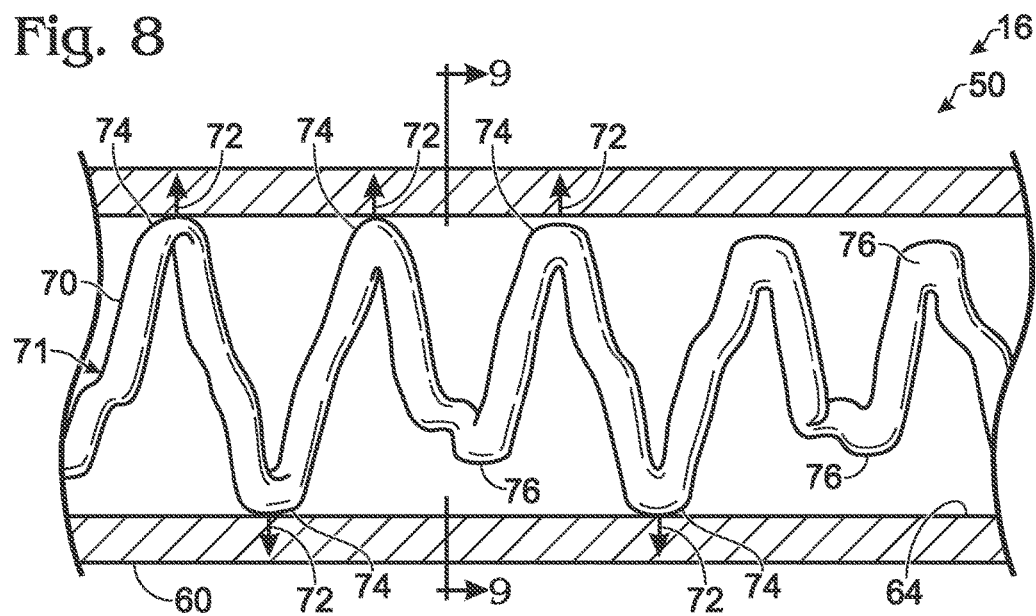
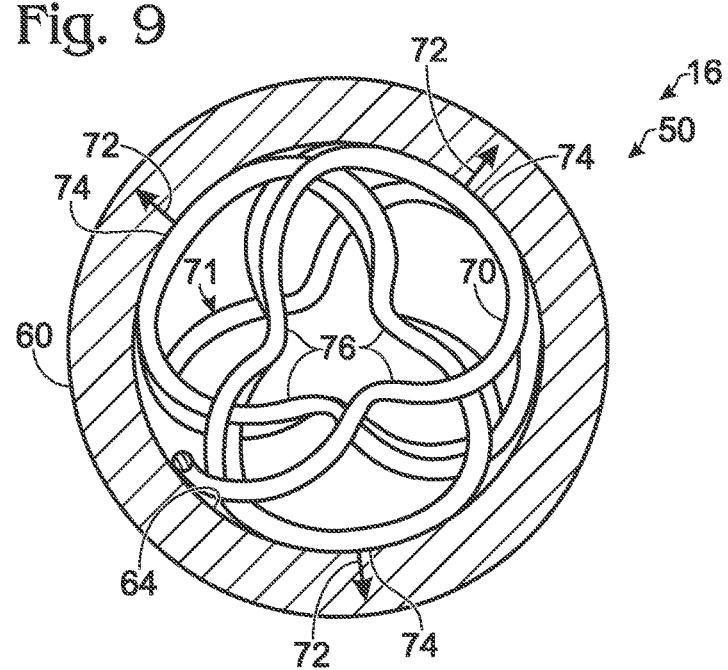

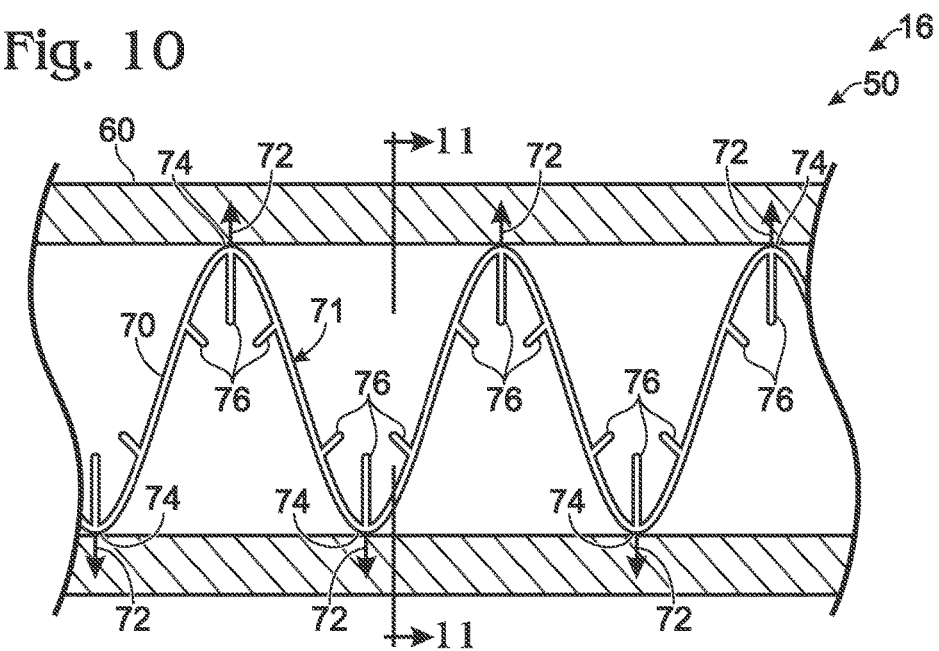
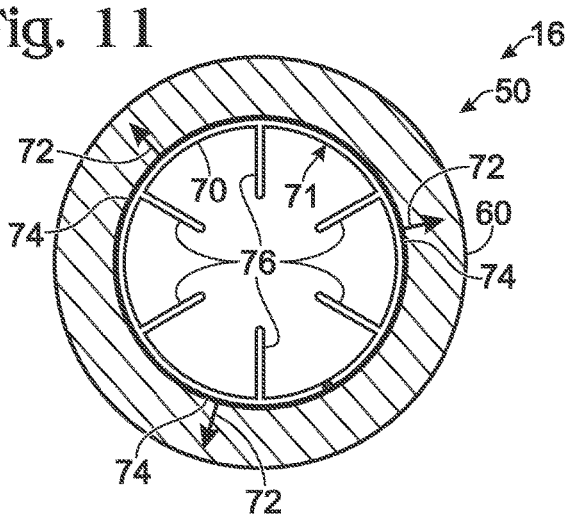
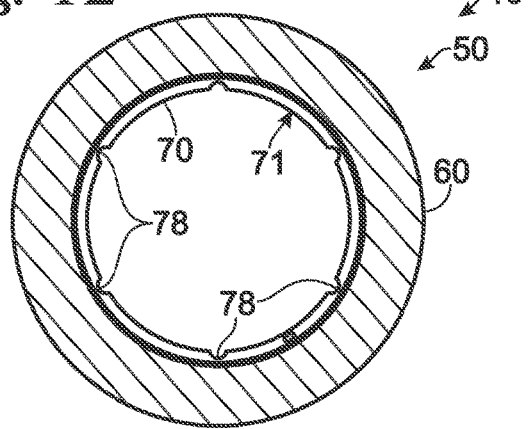
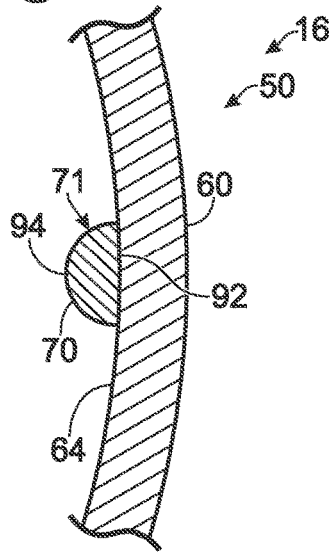

SHAPE MEMORY ALLOY ACTUATORS WITH HEAT TRANSFER STRUCTURES, ACTUATED ASSEMBLIES INCLUDING THE SHAPE MEMORY ALLOY ACTUATORS, AND METHODS OF MANUFACTURING THE SAME

FIELD

The present disclosure relates generally to shape memory alloy actuators, and more particularly to shape memory alloy actuators with heat transfer structures, to actuated assemblies that include the shape memory alloy actuators, and/or to methods of manufacturing the shape memory alloy actuators.

BACKGROUND

Shape memory alloy actuators are solid state actuators that may be utilized to provide a motive force for motion of one object, such as an attached component, relative to another object, such as a base structure to which the attached component is attached via the shape memory alloy actuator. Shape memory alloy actuators may generate the motive force via a phase change within a shape memory alloy element thereof, and this phase change may be initiated by a temperature change. As an example, the shape memory alloy element may transition from a martensite state to an austenite state upon being heated and also may transition from the austenite state to the martensite state upon being cooled.

Heating of the shape memory alloy element historically has been accomplished utilizing a heating assembly, such as a resistive heating element and/or an inductive heating element. In contrast, cooling of the shape memory alloy element historically has been accomplished via convective cooling with a heat transfer fluid stream. The heating generally may be performed relatively quickly; however, the cooling often takes a significantly longer amount of time and thus may be rate-limiting to an overall cycle time of the shape memory alloy actuator (e.g., a time needed to transition the shape memory alloy element from the martensite state to the austenite state and back to the martensite state or vice versa).

In general, a rate of convective cooling may be increased by increasing a surface area for heat transfer between a body to be cooled and a heat transfer fluid stream that flows in fluid contact with the body to be cooled. As an example, cooling fins may be affixed to the body to be cooled and/or may be defined by the body to be cooled.

While such an approach may be effective under certain circumstances, it may be difficult, or even impossible, to effectively and reliably implement in the context of a shape memory alloy element. As an example, the shape memory alloy element may experience significant physical deformation upon transitioning between the martensite state and the austenite state, and this physical deformation may make it difficult, or even impossible, to operatively attach cooling fins to the shape memory alloy element. As another example, a shape memory alloy that defines the shape memory alloy element may have a low thermal conductivity, and cooling fins that might be defined by the shape memory alloy element itself may not be effective at improving convective cooling of the shape memory alloy element. Thus, there exists a need for improved shape memory alloy actuators with heat transfer structures, for actuated assemblies that include the improved shape memory alloy actuators, and/or for methods of manufacturing the improved shape memory alloy actuators.

SUMMARY

Shape memory alloy actuators with heat transfer structures, actuated assemblies including the shape memory alloy actuators, and methods of manufacturing the same are disclosed herein. The shape memory alloy (SMA) actuators include a shape memory alloy torque tube and a heat transfer structure. The shape memory alloy torque tube has a first end, a second end, and an elongate surface extending between the first end and the second end. The heat transfer structure is in mechanical and thermal contact with the elongate surface of the SMA torque tube and extends at least partially between the first end and the second end of the SMA torque tube. The heat transfer structure also exerts a retention force on the SMA torque tube that retains the heat transfer structure in mechanical and thermal contact with the elongate surface of the SMA torque tube.

The actuated assemblies include a base structure, an attached component, and a shape memory alloy actuator. The shape memory alloy actuator operatively attaches the attached component to the base structure such that actuation of the shape memory alloy actuator produces relative motion between the base structure and the attached component.

The methods include providing a shape memory alloy torque tube, providing a heat transfer structure, applying a dimension-modifying force to the heat transfer structure, combining the heat transfer structure with the shape memory alloy torque tube, and releasing the dimension-modifying force. The applying the dimension-modifying force may include applying to place the heat transfer structure in a modified-dimensional conformation such that a modified characteristic dimension of the heat transfer structure differs from a natural characteristic dimension of the heat transfer structure prior to application of the dimension-modifying force. The combining includes combining such that the heat transfer structure extends at least partially between a first end and a second end of the SMA torque tube. The releasing includes releasing such that the heat transfer structure exerts a retention force on an elongate surface of the SMA torque tube.

BRIEF DESCRIPTION OF THE DRAWINGS

FIG. 1 is a schematic representation illustrating examples of an actuated assembly including a shape memory alloy actuator, according to the present disclosure.

FIG. 2 is a more detailed but still schematic longitudinal cross-sectional view of the shape memory alloy actuator of FIG. 1 taken along line 2-2 of FIG. 1.

FIG. 3 is a more detailed but still schematic transverse cross-sectional view of the shape memory alloy actuator of FIGS. 1-2 taken along line 3-3 of FIG. 1.

FIG. 8 is a less schematic partial transverse cross-sectional view illustrating an example of a shape memory alloy actuator according to the present disclosure.

FIG. 9 is a transverse cross-sectional view of the shape memory alloy actuator of FIG. 8 taken along line 9-9 of FIG. 8.

FIG. 10 is a less schematic partial transverse cross-sectional view illustrating an example of a shape memory alloy actuator according to the present disclosure.

FIG. 11 is a transverse cross-sectional view of the shape memory alloy actuator of FIG. 10 taken along 11-11 of FIG. 10.

FIG. 12 is a less schematic transverse cross-sectional view illustrating an example of a shape memory alloy actuator according to the present disclosure.

FIG. 13 is a less schematic transverse cross-sectional view of an example of an elongate conductive body that defines a heat transfer structure according to the present disclosure.

DESCRIPTION

Figure 4:
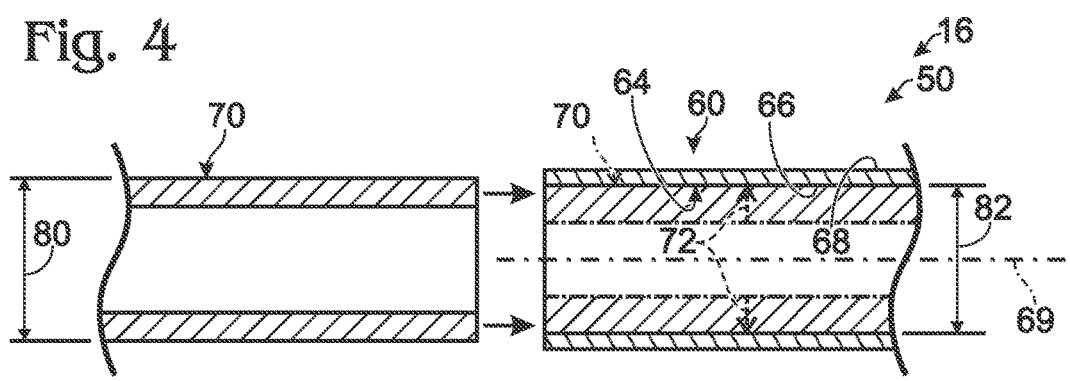
FIG. 4 is a partial schematic transverse cross-sectional view illustrating assembly of shape memory alloy actuators according to the present disclosure.

FIGS. 1-14 provide illustrative, non-exclusive examples of shape memory alloy actuators 50, according to the present disclosure, of actuated assemblies 16 including shape memory alloy actuators 50, and/or of methods 100, according to the present disclosure, of manufacturing shape memory alloy actuators, such as shape memory alloy actuators 50. Elements that serve a similar, or at least substantially similar, purpose are labeled with like numbers in each of FIGS. 1-14, and these elements may not be discussed in detail herein with reference to each of FIGS. 1-14. Similarly, all elements may not be labeled in each of FIGS. 1-14, but reference numerals associated therewith may be utilized herein for consistency. Elements, components, and/or features that are discussed herein with reference to one or more of FIGS. 1-14 may be included in and/or utilized with any of FIGS. 1-14 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic representation illustrating examples of an actuated assembly 16 including a shape memory alloy (SMA) actuator 50, according to the present disclosure. As illustrated in solid lines in FIG. 1, actuated assembly 16 includes a base structure 18, an attached component 20, and SMA actuator 50. As also illustrated in FIG. 1, attached component 20 is operatively attached to base structure 18 via and/or utilizing SMA actuator 50 and such that actuation of SMA actuator 50 produces and/or generates relative motion between base structure 18 and attached component 20. This is illustrated schematically in FIG. 1 by attached component 20 transitioning from a first, or an initial, orientation relative to base structure 18, as illustrated in solid lines, to a second, or subsequent, orientation relative to base structure 18, as illustrated in dash-dot lines.

It is within the scope of the present disclosure that SMA actuator 50 may produce, generate, regulate, and/or control any suitable motion, or relative motion, between base structure 18 and attached component 20. As examples, SMA actuator 50 may produce, generate, regulate, control, and/or provide a motive force for one or more of rotary relative motion, linear relative motion, translational relative motion, and/or arcuate relative motion between base structure 18 and attached component 20. As a more specific example, and as discussed in more detail herein with reference to FIGS. 2-13, SMA actuator 50 includes a shape memory alloy torque tube 60 that has an elongate surface and is configured to produce, generate, regulate, control, and/or provide a motive force for rotary relative motion between base structure 18 and attached component 20. As also discussed in more detail herein with reference to FIGS. 2-13, SMA actuator 50 includes a heat transfer structure 70 that is in mechanical and thermal contact with the elongate surface of SMA torque tube 60.

During operation of actuated assemblies 16 including SMA actuators 50, according to the present disclosure, a temperature of SMA torque tube 60 may be changed, thereby causing shape memory alloy torque tube 60 to deform and to generate, or to provide the motive force for, relative motion between the base structure and the attached component. As an example, SMA torque tube 60 may be heated, thereby causing SMA torque tube 60 to deform and/or to transition from a martensite state to an austenite state and causing attached component 20 to transition from the orientation that is illustrated in solid lines in FIG. 1 to the orientation that is illustrated in dash-dot lines. As another example, SMA torque tube 60 may be cooled, thereby causing SMA torque tube 60 to deform and/or to transition from the austenite state to the martensite state and causing attached component 20 to transition from the orientation that is illustrated in dash-dot lines in FIG. 1 to the orientation that is illustrated in solid lines. This process may be repeated any suitable number of times to produce and/or generate any suitable number of relative orientation transitions between base structure 18 and attached component 20.

Heat transfer structure 70 may improve, or increase, heat transfer to and/or from the SMA torque tube, thereby increasing a rate at which the SMA torque tube may be transitioned from the martensite state to the austenite state and/or from the austenite state to the martensite state. In addition, and as discussed in more detail herein with reference to FIGS. 3-5 and 8-11, heat transfer structure 70 exerts a retention force 72 on SMA torque tube 60, and retention force 72 retains heat transfer structure 70 in mechanical and thermal contact with SMA torque tube 60. Retention force 72 may retain heat transfer structure 70 in mechanical and thermal contact with SMA torque tube 60 despite deformation of SMA torque tube 60 and/or despite relative motion, or even sliding, between a portion of SMA torque tube 60 and a portion of heat transfer structure 70.

As illustrated in dashed lines in FIG. 1, actuated assembly 16 also may include a thermal control assembly 30. Thermal control assembly 30, when present, may be configured to control, regulate, and/or specify a temperature of SMA torque tube 60, thereby controlling, regulating, and/or specifying a state of SMA torque tube 60, a deformation of SMA torque tube 60, and/or a relative orientation between base structure 18 and attached component 20.

Thermal control assembly 30 may include any suitable structure and/or structures. As an example, thermal control assembly 30 may include a heating assembly 32. Heating assembly 32, when present, may be configured to heat SMA torque tube 60, to increase a temperature of SMA torque tube 60, and/or to cause SMA torque tube 60 to transition from the martensite state to the austenite state. Examples of heating assembly 32 include any suitable electric heater, resistive heater, and/or inductive heater.

As another example, thermal control assembly 30 additionally or alternatively may include a cooling assembly 34. Cooling assembly 34, when present, may be configured to cool SMA torque tube 60, to decrease a temperature of SMA torque tube 60, and/or to transition SMA torque tube 60 from the austenite state to the martensite state. Examples of cooling assembly 34 include any suitable convective cooling assembly, conductive cooling assembly, radiative cooling assembly, air conditioning system, solid state cooling assembly, and/or piezoelectric device.

As yet another example, thermal control assembly 30 additionally or alternatively may include a fluid propulsion system 36. Fluid propulsion system 36 may be configured to direct a heat transfer fluid stream 38 in thermal contact with the elongate surface of SMA torque tube 60 and/or with heat transfer structure 70, and it is within the scope of the present disclosure that the heat transfer fluid stream 38 may be utilized to heat and/or to cool SMA torque tube 60. Under these conditions, heating assembly 32 may be utilized to heat the heat transfer fluid stream 38 and/or cooling assembly 34 may be utilized to cool the heat transfer fluid stream 38 prior to fluid contact between the heat transfer fluid stream 38 and the elongate surface of SMA torque tube 60 and/or prior to fluid contact between the heat transfer fluid stream 38 and heat transfer structure 70.

With this in mind, FIG. 1 illustrates fluid propulsion system 36 as optionally being included in, forming a portion of, and/or being utilized in conjunction with heating assembly 32 and/or cooling assembly 34. In addition, and as discussed in more detail herein, heat transfer structure 70 may be adapted, configured, designed, sized, shaped, and/or constructed to increase heat transfer between SMA torque tube 60 and the heat transfer fluid stream when compared to prior art shape memory alloy actuators that do not include, or utilize, heat transfer structure 70.

As a more specific but still illustrative, non-exclusive example, thermal control assembly 30 may include heating assembly 32 in the form of an inductive heater, which may be configured to inductively heat SMA torque tube 60. In addition, thermal control assembly 30 also may include cooling assembly 34 in the form of fluid propulsion system 36, which may be configured to cool SMA torque tube 60 by flowing the heat transfer fluid stream in fluid contact with the elongate surface of SMA torque tube 60 and also in fluid contact with heat transfer structure 70.

Examples of fluid propulsion system 36 include any suitable fan, compressor, blower, pump, and/or air inlet that controls and/or regulates flow of the heat transfer fluid stream in thermal contact with the elongate surface of SMA torque tube 60 and/or with heat transfer structure 70. Examples of the heat transfer fluid stream include a thermally conductive fluid, a refrigerant, a liquid, a gas, and/or air.

Base structure 18 may include any suitable structure that may be operatively attached to, or may support, SMA actuator 50 and/or attached component 20. As examples, base structure 18 may include one or more of an aircraft, an airplane, and/or a helicopter. Similarly, attached component 20 may include any suitable structure that may be operatively attached to base structure 18 via SMA actuator 50 and/or that may be moved relative to base structure 18 via actuation of SMA actuator 50. As examples, attached component 20 may include one or more of an actuated component, a landing gear, a flap, an aileron, and/or a rotor.

FIG. 2 is a more detailed but still schematic longitudinal cross-sectional view of a shape memory alloy actuator 50, such as shape memory alloy actuator 50 of FIG. 1, taken along line 2-2 of FIG. 1, while FIG. 3 is a more detailed but still schematic transverse cross-sectional view of SMA actuator 50 taken along line 3-3 of FIG. 1. As illustrated collectively by FIGS. 2-3, SMA actuator 50 includes SMA torque tube 60 that defines a first end 61, a second end 62, and an elongate surface 64 that extends between first end 61 and second end 62. Elongate surface 64 is illustrated in dashed lines to indicate that elongate surface 64 can include, or be, an inner surface 66 of SMA torque tube 60 and/or an outer surface 68 of SMA torque tube 60.

SMA actuator 50 also includes heat transfer structure 70. Heat transfer structure 70 is in both mechanical and thermal contact with elongate surface 64 of SMA torque tube 60 and extends at least partially between first end 61 and second end 62 of SMA torque tube 60. In addition, and as illustrated in FIGS. 3-5 and 8-11, heat transfer structure 70 exerts retention force 72 on SMA torque tube 60, and retention force 72 retains heat transfer structure 70 in both mechanical and thermal contact with elongate surface 64 of SMA torque tube 60. Heat transfer structure 70 also may be referred to herein as being, or may be, in electrical contact, or in direct electrical contact, with elongate surface 64 of SMA torque tube 60.

Heat transfer structure 70 may exert and/or generate retention force 72 in any suitable manner. As an example, retention force 72 may include, or be, a restoring force that is generated by heat transfer structure 70.

As a more specific example, and as illustrated in dash-dot lines in FIG. 4, heat transfer structure 70 may be in mechanical and thermal contact with inner surface 66 of SMA torque tube 60. Stated another way, elongate surface 64 may include, or be, inner surface 66. As such, retention force 72 may extend outward from, generally outward from, or away from, a longitudinal axis 69 of SMA torque tube 60. Under these conditions, heat transfer structure 70 may define an uncompressed, or an average uncompressed, outer dimension 80, which is measured prior to heat transfer structure 70 being combined with SMA torque tube 60 to define SMA actuator 50 (illustrated in solid lines in FIG. 4), and a compressed, or an average compressed, outer dimension 82, which is measured subsequent to heat transfer structure 70 being combined with SMA torque tube 60 to define SMA actuator 50 (illustrated in dash-dot lines in FIG. 4). Uncompressed outer dimension 80 may be greater than compressed outer dimension 82, thereby causing heat transfer structure 70 to exert retention force 72, in the form of the restoring force, on inner surface 66 of SMA torque tube 60.

Figure 5:
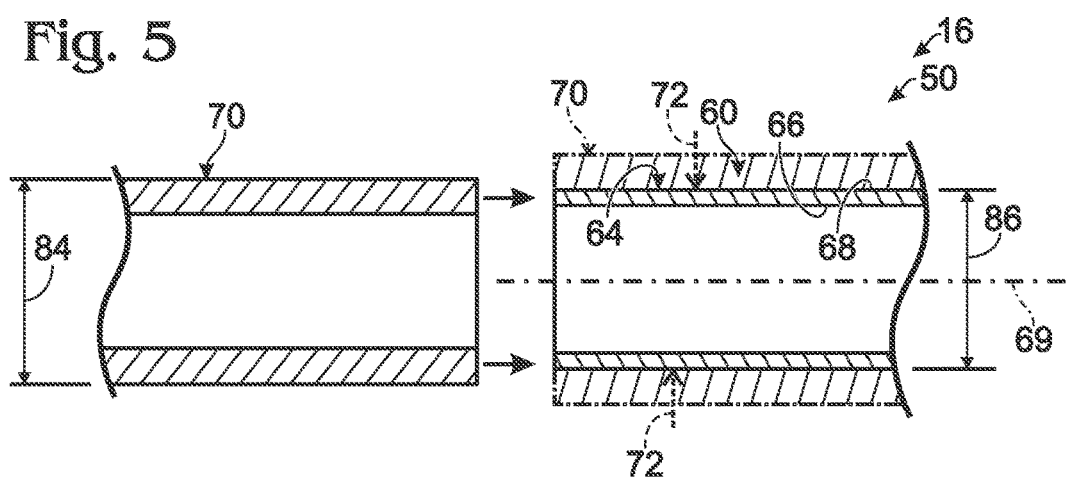
FIG. 5 is a partial schematic transverse cross-sectional view illustrating assembly of shape memory alloy actuators according to the present disclosure.
Figure 6:
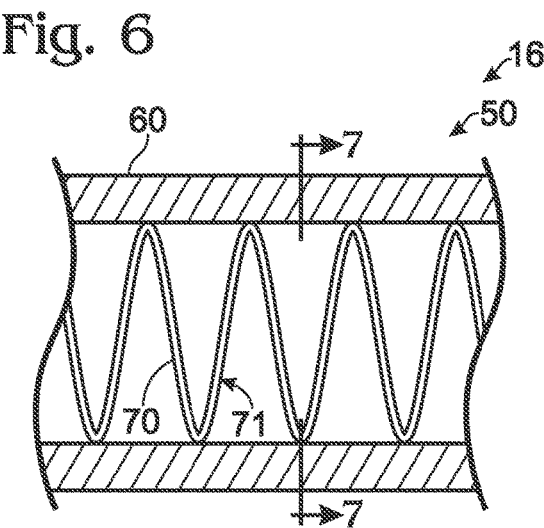
FIG. 6 is a less schematic partial transverse cross-sectional view illustrating an example of a shape memory alloy actuator according to the present disclosure.
Figure 7:
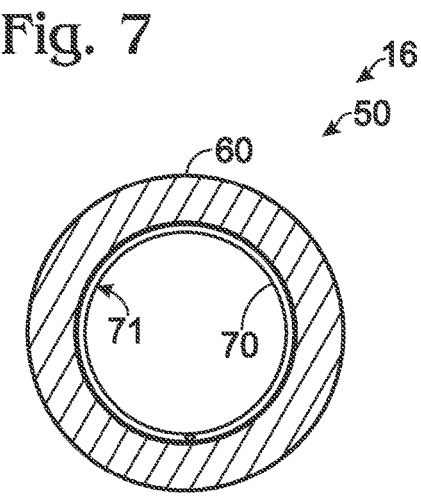
FIG. 7 is a transverse cross-sectional view of the shape memory alloy actuator of FIG. 6 taken along line 7-7 of FIG. 6.

As another more specific example, and as illustrated in dash-dot lines in FIG. 5, heat transfer structure 70 may be in mechanical and thermal contact with outer surface 68 of SMA torque tube 60. Stated another way, elongate surface 64 may include, or be, outer surface 68. As such, retention force 72 may extend inward toward, generally inward toward, or toward, longitudinal axis 69 of SMA torque tube 60. Under these conditions, heat transfer structure 70 may define an unexpanded, or an average unexpanded, inner dimension 84, which is measured prior to heat transfer structure 70 being combined with SMA torque tube 60 to define SMA actuator 50 (illustrated in solid lines in FIG. 5), and an expanded, or an average expanded, inner dimension 86, which is measured subsequent to heat transfer structure 70 being combined with SMA torque tube 60 to define SMA actuator 50 (illustrated in dash-dot lines in FIG. 5). Unexpanded inner dimension 84 may be less than expanded inner dimension 86, thereby causing heat transfer structure 70 to exert retention force 72 on outer surface 68 of SMA torque tube 60.

It is within the scope of the present disclosure that heat transfer structure 70 may be retained in mechanical and thermal contact with SMA torque tube 60 solely by retention force 72. Additionally or alternatively, heat transfer structure 70 may be retained in mechanical and thermal contact with SMA torque tube 60 solely by retention force 72. This may include being retained in mechanical and thermal contact with SMA torque tube 60 over at least a threshold fraction of a length 88 (as illustrated in FIG. 2) of heat transfer structure 70. Examples of the threshold fraction of length 88 include at least 10%, at least 20%, at least 30%, at least 40%, at least 50%, at least 60% at least 70%, at least 80%, at least 90%, and/or 100% of length 88. Additionally or alternatively, the threshold fraction of length 88 may be at most 90%, at most 80%, at most 70%, at most 60%, or at most 50% of length 88.

Heat transfer structure 70 may have and/or define any suitable shape and may have, may define, and/or may be shaped to define, a surface area for heat transfer between SMA torque tube 60 and a heat transfer fluid stream that flows in fluid contact therewith. As an example, and as illustrated in FIGS. 6-11, heat transfer structure 70 may be helically shaped, at least partially helically shaped, coil-shaped, at least partially coil-shaped, spiral-shaped, at least partially spiral-shaped, arcuate, and/or at least partially arcuate. As another example, and as illustrated schematically in FIG. 3 and less schematically in FIGS. 8-11, heat transfer structure 70 may include at least one, or even a plurality of, surface-contacting regions 74 that mechanically and thermally contact elongate surface 64 of SMA torque tube 60 and apply retention force 72 to SMA torque tube 60. In addition, heat transfer structure 70 also may include a plurality of projecting regions 76 that project from, or away from, elongate surface 64. This may include projecting away from elongate surface 64 at any suitable angle. As an example, projecting regions 76 may project perpendicular, or at least substantially perpendicular, to elongate surface 64.

When heat transfer structure 70 includes the plurality of surface-contacting regions 74 and the plurality of projecting regions 76, each surface-contacting region 74 may be spaced apart from an adjacent surface-contacting region 74 by a corresponding projecting region 76, as illustrated in FIGS. 8-9. Additionally or alternatively, the plurality of surface-contacting regions 74 may form a continuous, or at least substantially continuous, surface-contacting region 74, as illustrated in FIGS. 10-11.

As illustrated schematically in FIG. 3 and less schematically in FIGS. 6-11, heat transfer structure 70 may include, be, and/or be at least partially defined by an elongate conductive body 71. It is within the scope of the present disclosure that elongate conductive body 71 may define, or may be shaped to define, both surface-contacting regions 74 and projecting regions 76, as illustrated in FIGS. 8-9. Under these conditions, elongate conductive body 71 may have, or define, a body length, and elongate conductive body 71 may be in mechanical and thermal contact with elongate surface 64 of SMA torque tube 60 over a fraction of the body length. As examples, the fraction of the body length may be at least 10%, at least 20%, at least 30%, at least 40%, and/or at least 50% of the body length. Additionally or alternatively, the fraction of the body length may be at most 100%, at most 90%, at most 80%, at most 70%, at most 60%, or at most 50% of the body length.

Additionally or alternatively, at least a subset, or fraction, of the plurality of projecting regions 76, when present, may be operatively attached to elongate conductive body 71, as illustrated in FIGS. 10-11. As an example, projecting regions 76 may be adhered, brazed, and/or welded to elongate conductive body 71.

Turning now more specifically to FIGS. 8-9, an example of shape memory alloy actuator 50 is illustrated in which an elongate conductive body 71 forms and/or defines an entirety of heat transfer structure 70. Elongate conductive body 71 includes a plurality of helical, or at least substantially helical, regions, which are in mechanical and thermal contact with elongate surface 64 of SMA torque tube 60 and define surface-contacting regions 74. In addition, elongate conductive body 71 also includes a plurality of deviation regions, which deviate from a helical shape and project away from elongate surface 64 to define projecting regions 76. As illustrated, a corresponding deviation (i.e., projecting region 76) extends between each adjacent pair of helical regions (i.e., surface-contacting regions 74).

It is within the scope of the present disclosure that heat transfer structure 70 may have and/or define any suitable cross-sectional shape, or transverse cross-sectional shape. As an example, and as illustrated in FIGS. 3 and 12, heat transfer structure 70 may include one or more subtraction regions 78, which also may be referred to herein as void spaces 78, machined regions 78, and/or subtractively machined regions 78. Such subtraction regions 78 may increase a surface area of heat transfer structure 70, thereby improving convective heat transfer between heat transfer structure 70 and the heat transfer fluid stream.

As another example, heat transfer structure 70 may be shaped such that a surface of heat transfer structure 70 that is in mechanical and thermal contact with elongate surface 64 of SMA torque tube 60 may be in face-to-face, or at least partial face-to-face, contact with elongate surface 64. This is illustrated in FIG. 13, which is a less schematic transverse cross-sectional view of an example of an elongate conductive body 71 that defines a heat transfer structure 70 according to the present disclosure. As illustrated therein, heat transfer structure 70 may define a conductive heat transfer surface 92 and a convective heat transfer surface 94. Conductive heat transfer surface 92 may be shaped to mechanically and thermally contact elongate surface 64 of SMA torque tube 60, while convective heat transfer surface 94 may be shaped for heat transfer with the heat transfer fluid stream. As an example, and as illustrated, a transverse cross-section of conductive heat transfer surface 92 may be linear, or at least substantially linear. In contrast, and as also illustrated, a transverse cross-section of convective heat transfer surface 94 may be nonlinear, arcuate, partially circular, partially elliptical, and/or D-shaped. Additionally or alternatively, a radius of curvature of conductive heat transfer surface 92 may be greater than a radius of curvature of convective heat transfer surface 94, and both radii of curvature may be measured in the transverse cross-section of elongate conductive body 71.

Heat transfer structure 70 may be formed from and/or defined by any suitable heat transfer material, and the heat transfer material may be different from a shape memory alloy that defines SMA torque tube 60. As an example, the heat transfer material may have a greater thermal conductivity than the shape memory alloy. As another example, the heat transfer material may have a greater stiffness than the shape memory alloy. As yet another example, the heat transfer material may have a greater electronegativity than the shape memory alloy such that the heat transfer material functions as a sacrificial anode for the shape memory alloy.

Examples of the heat transfer material include a resilient material, aluminum, an aluminum alloy, copper, a copper alloy, brass, and red brass. Examples of the shape memory alloy include a binary alloy, a nickel-titanium alloy, a binary nickel-titanium alloy, a ternary alloy, a ternary alloy that includes nickel and titanium and further includes hafnium, copper, iron, silver, cobalt, chromium, vanadium, and/or a quaternary alloy.

It is within the scope of the present disclosure that SMA torque tube 60 may have and/or define any suitable shape. As examples, SMA torque tube 60 may be tubular and/or cylindrical. As another example, SMA torque tube 60 may be a hollow SMA torque tube and heat transfer structure 70 may extend therein. As yet another example, SMA torque tube 60 may define both inner surface 66 and outer surface 68, which are discussed herein.

Returning to FIGS. 2-3, shape memory alloy actuators 50, according to the present disclosure, also may include a thermal sensor 90. Thermal sensor 90, when present, may be configured to detect a temperature of SMA torque tube 60. In addition, thermal sensor 90 may be operatively attached to heat transfer structure 90 and/or may be pressed into mechanical and thermal contact with SMA torque tube 60 via and/or utilizing heat transfer structure 70. Under these conditions, thermal sensor 90 may not be, or may not be required to be, adhered and/or affixed to a specific region of SMA torque tube 60. Examples of thermal sensor 90 include a thermocouple, a thermistor, and/or a resistance temperature detector (RTD).

Figure 14:
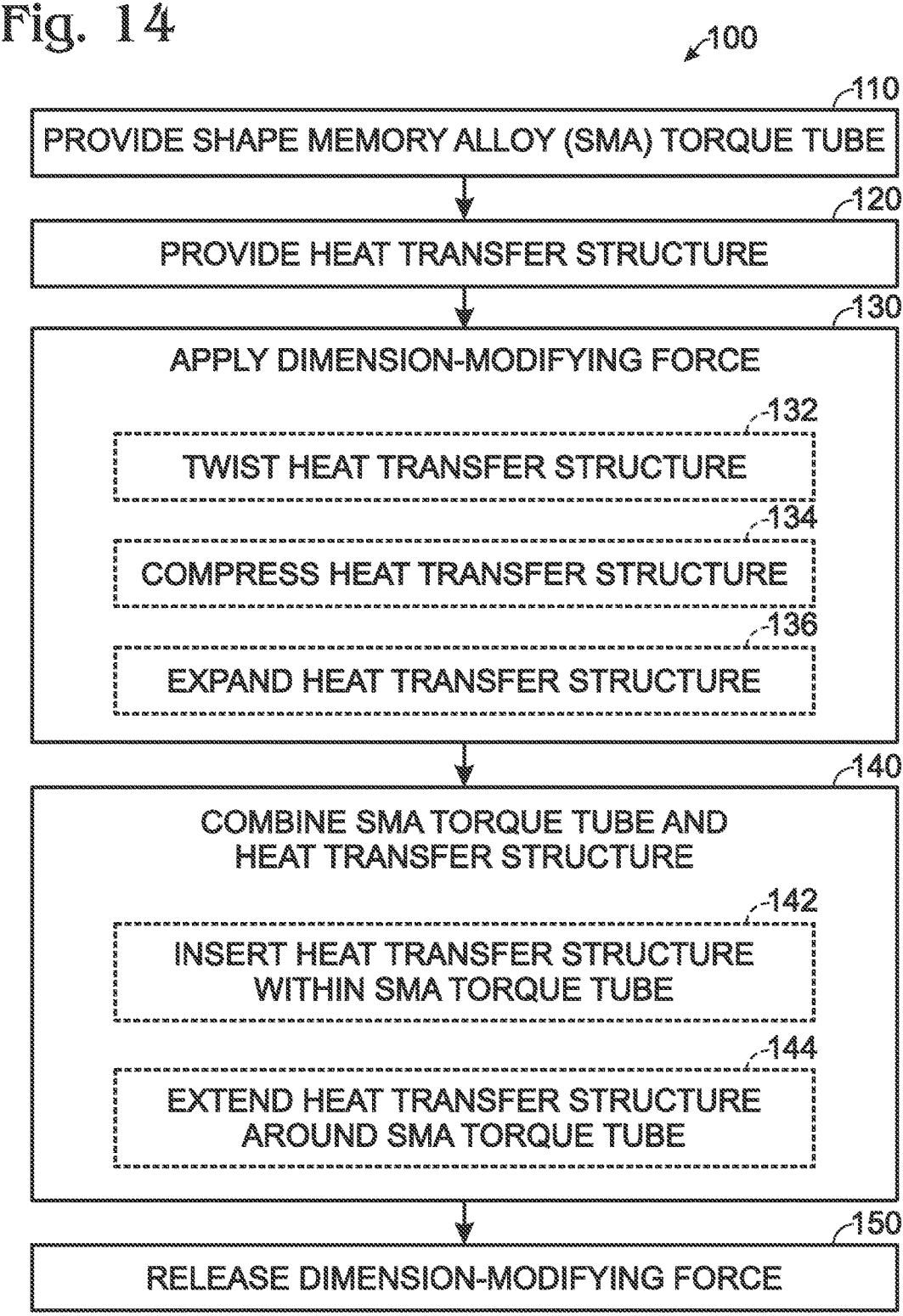
FIG. 14 is a flowchart depicting methods, according to the present disclosure, of manufacturing a shape memory alloy actuator.

FIG. 14 is a flowchart depicting methods 100, according to the present disclosure, of manufacturing a shape memory alloy actuator, such as shape memory alloy actuator 50 of FIGS. 1-13. Methods 100 include providing a shape memory alloy (SMA) torque tube at 110, providing a heat transfer structure at 120, applying a dimension-modifying force at 130, combining the SMA torque tube and the heat transfer structure at 140, and releasing the dimension-modifying force at 150.

Providing the shape memory alloy (SMA) torque tube at 110 may include providing any suitable SMA torque tube, examples of which are discussed herein with reference to SMA torque tube 60. The SMA torque tube may have and/or define a first end, a second end, and an elongate surface that extends between the first end and the second end. The providing at 110 may include providing in any suitable manner. As examples, the providing at 110 may include purchasing, obtaining, ordering, and/or fabricating the SMA torque tube.

Providing the heat transfer structure at 120 may include providing any suitable heat transfer structure, examples of which are discussed herein with reference to heat transfer structure 70. The providing at 120 may include providing in any suitable manner. As examples, the providing at 120 may include purchasing, obtaining, ordering, and/or fabricating the heat transfer structure.

Applying the dimension-modifying force at 130 may include applying any suitable dimension-modifying force to the heat transfer structure, and application of the dimension-modifying force may permit and/or facilitate the combining at 140. As an example, the applying at 130 may include applying the dimension-modifying force to place the heat-transfer structure in a modified-dimensional conformation such that a modified characteristic dimension of the heat transfer structure differs from a natural, or unmodified, characteristic dimension of the heat transfer structure that may be exhibited by the heat transfer structure prior to application of the dimension-modifying force to the heat transfer structure. As examples, the applying at 130 may include twisting the heat transfer structure, as indicated at 132, compressing the heat transfer structure, as indicated at 134, and/or expanding the heat transfer structure, as indicated at 136.

Combining the SMA torque tube and the heat transfer structure at 140 may include combining such that the heat transfer structure extends at least partially between the first end of the SMA torque tube and the second end of the SMA torque tube and/or combining such that the heat transfer structure extends along, in contact with, and/or parallel to the elongate surface of the SMA torque tube. As an example, the elongate surface of the SMA torque tube may include, or be, an inner surface of the SMA torque tube. Under these conditions, the applying at 130 may include the twisting at 132 and/or the compressing at 134, such that the modified characteristic dimension is less than the natural characteristic dimension, and the combining at 140 may include inserting the heat transfer structure within the SMA torque tube, as indicated at 142. As another example, the elongate surface of the SMA torque tube may include, or be, an outer surface of the SMA torque tube. Under these conditions, the applying at 130 may include the twisting at 132 and/or the expanding at 136, such that the modified characteristic dimension is greater than the natural characteristic dimension, and the combining at 140 may include extending the heat transfer structure around, or about, the SMA torque tube, as indicated at 144.

Releasing the dimension-modifying force at 150 may include releasing the dimension-modifying force such that the heat transfer structure transitions to an intermediate conformation in which an intermediate characteristic dimension of the heat transfer is between the modified characteristic dimension and the natural characteristic dimension. Under these conditions, the heat transfer structure may exert a restoring force, which may tend to return the heat transfer structure to the natural characteristic dimension, and this restoring force may cause the heat transfer structure to exert a retention force on the elongate surface of the SMA torque tube. This retention force may retain the heat transfer structure in mechanical and thermal contact with the elongate surface of the SMA torque tube.

Illustrative, non-exclusive examples of inventive subject matter according to the present disclosure are described in the following enumerated paragraphs:

A1. A shape memory alloy actuator, comprising:

a shape memory alloy (SMA) torque tube having a first end, a second end, and an elongate surface extending between the first end and the second end; and a heat transfer structure, wherein the heat transfer structure:

(i) is in mechanical and thermal contact with the elongate surface of the SMA torque tube;

(ii) extends at least partially between the first end and the second end of the SMA torque tube; and (iii) exerts a retention force on the SMA torque tube that retains the heat transfer structure in mechanical and thermal contact with the elongate surface of the SMA torque tube.

A2. The actuator of paragraph A1, wherein the heat transfer structure has a surface area for heat transfer between the SMA torque tube and a heat transfer fluid stream.

A3. The actuator of any of paragraphs A1-A2, wherein the heat transfer structure is at least one of helically shaped, at least partially helically shaped, coil-shaped, at least partially coil-shaped, spiral-shaped, and at least partially spiral-shaped.

A4. The actuator of any of paragraphs A1-A3, wherein the heat transfer structure includes a plurality of surface-contacting regions that mechanically and thermally contacts the elongate surface of the SMA torque tube and applies the retention force to the elongate surface of the SMA torque tube, and a plurality of projecting regions that projects from the elongate surface of the SMA torque tube.

A5. The actuator of paragraph A4, wherein the heat transfer structure is at least partially defined by an elongate conductive body.

A6. The actuator of paragraph A5, wherein the elongate conductive body is shaped to define both the plurality of surface-contacting regions and the plurality of projecting regions.

A7. The actuator of any of paragraphs A5-A6, wherein at least a subset of the plurality of projecting regions is operatively attached to the elongate conductive body.

A8. The actuator of any of paragraphs A5-A7, wherein the elongate conductive body further includes a plurality of subtraction regions.

A9. The actuator of any of paragraphs A5-A8, wherein the elongate conductive body has a body length, and further wherein the elongate conductive body is in mechanical and thermal contact with the elongate surface of the SMA torque tube over a fraction of the body length, optionally wherein the fraction of the body length is at least one of:
(i) at least 10%, at least 20%, at least 30%, at least 40%, or at least 50% of the body length; and
(ii) at most 100%, at most 90%, at most 80%, at most 70%, at most 60%, or at most 50% of the body length.

A10. The actuator of any of paragraphs A5-A9, wherein the elongate conductive body is arcuate, or at least partially arcuate.

A11. The actuator of any of paragraphs A4-A10, wherein each of the plurality of surface-contacting regions is spaced apart from an adjacent surface-contacting region of the plurality of surface-contacting regions by a corresponding projecting region of the plurality of projecting regions.

A12. The actuator of any of paragraphs A4-A10, wherein at least a subset of the plurality of projecting regions projects perpendicular, or at least substantially perpendicular, from the elongate surface of the SMA torque tube.

A13. The actuator of any of paragraphs A1-A12, wherein the heat transfer structure includes an/the elongate conductive body, wherein the elongate conductive body has a plurality of helical, or at least substantially helical, regions that are in mechanical and thermal contact with the elongate surface of the SMA torque tube, and a plurality of deviation regions that deviate from a helical shape and project away from the elongate surface of the SMA torque tube, wherein a corresponding deviation region of the plurality of deviation regions extends between each adjacent pair of helical regions of the plurality of helical regions.

A14. The actuator of any of paragraphs A1-A13, wherein the heat transfer structure is shaped such that a surface of the heat transfer structure that is in mechanical and thermal contact with the elongate surface of the SMA torque tube is in at least partial face-to-face contact with the elongate surface of the SMA torque tube.

A15. The actuator of any of paragraphs A1-A14, wherein the heat transfer structure includes an/the elongate conductive body, and further wherein the elongate conductive body defines a conductive heat transfer surface, which is shaped to mechanically and thermally contact the elongate surface of the SMA torque tube, and a convective heat transfer surface, which is shaped for heat transfer with a/the heat transfer fluid stream.

A16. The actuator of paragraph A15, wherein a transverse cross-section of the conductive heat transfer surface is linear, or at least substantially linear.

A17. The actuator of any of paragraphs A15-A16, wherein a transverse cross-section of the convective heat transfer surface is at least one of:
(i) nonlinear;
(ii) arcuate;
(iii) partially circular;
(iv) partially elliptical; and
(v) D-shaped A18. The actuator of any of paragraphs A1-A17, wherein the heat transfer structure is retained in mechanical and thermal contact with the elongate surface of the SMA torque tube solely by the retention force, and optionally over at least a threshold fraction of a length of the heat transfer structure, optionally wherein the threshold fraction of the length of the heat transfer structure is at least one of:
(i) at least 10%, at least 20%, at least 30%, at least 40%, at least 50%, at least 60% at least 70%, at least 80%, at least 90%, or 100% of the length of the heat transfer structure; and
(i) at most 90%, at most 80%, at most 70%, at most 60%, or at most 50% of the length of the heat transfer structure.

A19. The actuator of any of paragraphs A1-A18, wherein the retention force is a restoring force generated by the heat transfer structure.

A20. The actuator of any of paragraphs A1-A19, wherein the heat transfer structure further is in electrical, or direct electrical, contact with the elongate surface of the SMA torque tube.

A21. The actuator of any of paragraphs A1-A20, wherein the heat transfer structure is defined by a heat transfer material, wherein the SMA torque tube is defined by a shape memory alloy, and further wherein the heat transfer material is different from the shape memory alloy.

A22. The actuator of paragraph A21, wherein the heat transfer material has a greater thermal conductivity than the shape memory alloy.

A23. The actuator of any of paragraphs A21-A22, wherein the heat transfer material has a greater stiffness than the shape memory alloy.

A24. The actuator of any of paragraphs A21-A23, wherein the heat transfer material has a more negative electrochemical potential than the shape memory alloy such that the heat transfer material functions as a sacrificial anode for the shape memory alloy.

A25. The actuator of any of paragraphs A21-A24, wherein the heat transfer material includes, and optionally is, at least one of a resilient material, aluminum, an aluminum alloy, copper, a copper alloy, brass, and red brass.

A26. The actuator of any of paragraphs A21-A25, wherein the shape memory alloy includes, and optionally is, at least one of a binary alloy, a nickel-titanium alloy, a binary nickel-titanium alloy, a ternary alloy, a ternary alloy that includes nickel and titanium and further includes hafnium, copper, iron, silver, cobalt, chromium, vanadium, and/or a quaternary alloy.

A27. The actuator of any of paragraphs A21-A26, wherein the shape memory alloy is configured to transform from a martensite state to an austenite state responsive to an increase in a temperature of the shape memory alloy, and further wherein the shape memory alloy is configured to transform from the austenite state to the martensite state responsive to a decrease in the temperature of the shape memory alloy.

A28. The actuator of any of paragraphs A1-A27, wherein the SMA torque tube is at least one of tubular and cylindrical.

A29. The actuator of any of paragraphs A1-A28, wherein the SMA torque tube is a hollow SMA torque tube.

A30. The actuator of any of paragraphs A1-A29, wherein the SMA torque tube defines an inner surface and an outer surface.

A31. The actuator of paragraph A30, wherein the elongate surface of the SMA torque tube includes, and optionally is, the inner surface.

A32. The actuator of paragraph A31, wherein the retention force extends outward from a longitudinal axis of the SMA torque tube.

A33. The actuator of any of paragraphs A30-A32, wherein the elongate surface of the SMA torque tube includes, and optionally is, the outer surface.

A34. The actuator of paragraph A33, wherein the retention force extends inward toward a/the longitudinal axis of the SMA torque tube.

A35. The actuator of any of paragraphs A1-A34, wherein the shape memory alloy actuator further includes a thermal sensor configured to detect a temperature of the SMA torque tube.

A36. The actuator of paragraph A35, wherein the thermal sensor is operatively attached to the heat transfer structure.

A37. The actuator of any of paragraphs A35-A36 wherein the heat transfer structure presses the thermal sensor into mechanical and thermal contact with the elongate surface of the SMA torque tube.

A38. The actuator of any of paragraphs A35-A37, wherein the thermal sensor includes at least one of a thermocouple, a thermistor, and a resistance temperature detector (RTD).

B1. An actuated assembly, comprising:
a base structure;
an attached component; and
the shape memory alloy actuator of any of paragraphs A1-A38, wherein the attached component is operatively attached to the base structure via the shape memory alloy actuator such that actuation of the shape memory alloy actuator produces relative motion between the base structure and the attached component.

B2. The assembly of paragraph B1, wherein the actuated assembly further includes a thermal control assembly configured to regulate a temperature of the SMA torque tube.

B3. The assembly of paragraph B2, wherein the thermal control assembly includes a heating assembly configured to heat the SMA torque tube.

B4. The assembly of any of paragraphs B2-B3, wherein the thermal control assembly includes a cooling assembly configured to cool the SMA torque tube.

B5. The assembly of any of paragraphs B2-B4, wherein the thermal control assembly includes a fluid propulsion system configured to direct a/the heat transfer fluid stream in thermal contact with the elongate surface of the SMA torque tube and with the heat transfer structure.

B6. The assembly of any of paragraphs B1-B5, wherein the base structure includes one of an aircraft, an airplane, and a helicopter.

B7. The assembly of any of paragraphs B1-B6, wherein the attached component includes one of an actuated component, a landing gear, a flap, an aileron, and a rotor.

C1. A method of manufacturing a shape memory alloy actuator, the method comprising:
providing a shape memory alloy (SMA) torque tube that defines a first end, a second end, and an elongate surface extending between the first end and the second end;
providing a heat transfer structure;
applying a dimension-modifying force to the heat transfer structure to place the heat transfer structure in a modified-dimensional conformation such that a modified characteristic dimension of the heat transfer structure differs from a natural characteristic dimension of the heat transfer structure prior to application of the dimension-modifying force;
combining the heat transfer structure with the SMA torque tube such that the heat transfer structure extends at least partially between the first end and the second end of the SMA torque tube; and
releasing the dimension-modifying force such that the heat transfer structure transitions to an intermediate conformation in which an intermediate characteristic dimension of the heat transfer structure is between the modified characteristic dimension and the natural characteristic dimension and also such that the heat transfer structure exerts a retention force on the elongate surface of the SMA torque tube to retain the heat transfer structure in mechanical and thermal contact with the elongate surface of the SMA torque tube.

C2. The method of paragraph C1, wherein the SMA torque tube defines an inner surface and an outer surface, wherein the elongate surface includes the inner surface, and further wherein the combining includes inserting the heat transfer structure within the SMA torque tube.

C3. The method of any of paragraphs C1-C2, wherein the SMA torque tube defines an/the inner surface and an/the outer surface, wherein the elongate surface includes the outer surface, and further wherein the combining includes extending the heat transfer structure around the SMA torque tube.

C4. The method of any of paragraphs C1-C3, wherein the applying the dimension-modifying force includes twisting the heat transfer structure about a longitudinal axis thereof.

C5. The method of any of paragraphs C1-C4, wherein the shape memory alloy actuator is the shape memory alloy actuator of any of paragraphs A1-A38.

C6. The method of any of paragraphs C1-C4, wherein the shape memory alloy actuator includes any suitable structure, function, and/or feature of any of the shape memory alloy actuators of any of paragraphs A1-A38.

C7. The method of any of paragraphs C1-C4 utilized to construct the actuator of any of paragraphs A1-A38.

C8. The method of any of paragraphs C1-C4 utilized to construct the assembly of any of paragraphs B1-B7.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A shape memory alloy actuator, comprising:
a shape memory alloy (SMA) torque tube having a first end, a second end, and an elongate surface extending between the first end and the second end; and
a heat transfer structure configured to increase heat transfer with the SMA torque tube to increase a rate at which the SMA torque tube transitions between a martensite state and an austenite state, wherein the heat transfer structure:
(i) is in mechanical and thermal contact with the elongate surface of the SMA torque tube;
(ii) extends at least partially between the first end and the second end of the SMA torque tube;
(iii) exerts a retention force on the SMA torque tube that retains the heat transfer structure in mechanical and thermal contact with the elongate surface of the SMA torque tube;
(iv) is shaped such that a surface of the heat transfer structure that is in mechanical and thermal contact with the elongate surface of the SMA torque tube is in at least partial face-to-face contact with the elongate surface of the SMA torque tube; and
(v) includes an elongate conductive body, wherein the elongate conductive body has a plurality of at least substantially helical regions that are in mechanical and thermal contact with the elongate surface of the SMA torque tube and a plurality of deviation regions that deviate from a helical shape and project away from the elongate surface of the SMA torque tube, wherein a corresponding deviation region of the plurality of deviation regions extends between adjacent pairs of helical regions of the plurality of helical regions.

2. The actuator of claim 1, wherein the heat transfer structure is at least one of helically shaped, at least partially helically shaped, coil-shaped, at least partially coil-shaped, spiral-shaped, and at least partially spiral-shaped.

3. The actuator of claim 1, wherein the heat transfer structure includes a plurality of surface-contacting regions that mechanically and thermally contacts the elongate surface of the SMA torque tube and applies the retention force to the elongate surface of the SMA torque tube, and a plurality of projecting regions that projects from the elongate surface of the SMA torque tube.

4. The actuator of claim 3, wherein the heat transfer structure is at least partially defined by an elongate conductive body, and further wherein the elongate conductive body is shaped to define both the plurality of surface-contacting regions and the plurality of projecting regions.

5. The actuator of claim 3, wherein the heat transfer structure is at least partially defined by an elongate conductive body, and further wherein at least a subset of the plurality of projecting regions is operatively attached to the elongate conductive body.

6. The actuator of claim 3, wherein each of the plurality of surface-contacting regions is spaced apart from an adjacent surface-contacting region of the plurality of surface-contacting regions by a corresponding projecting region of the plurality of projecting regions.

7. The actuator of claim 1, wherein the heat transfer structure includes an elongate conductive body, and further wherein the elongate conductive body defines a conductive heat transfer surface, which is shaped to mechanically and thermally contact the elongate surface of the SMA torque tube, and a convective heat transfer surface, which is shaped for heat transfer with a heat transfer fluid stream, wherein a transverse cross-section of the conductive heat transfer surface is at least substantially linear, and further wherein a transverse cross-section of the convective heat transfer surface is at least one of:
(i) nonlinear;
(ii) arcuate;
(iii) partially circular;
(iv) partially elliptical; and
(v) D-shaped.

8. The actuator of claim 1, wherein the heat transfer structure is retained in mechanical and thermal contact with the elongate surface of the SMA torque tube solely by the retention force over at least a fraction of a length of the heat transfer structure.

9. The actuator of claim 1, wherein the heat transfer structure is defined by a heat transfer material, wherein the SMA torque tube is defined by a shape memory alloy, and further wherein the heat transfer material is different from the shape memory alloy.

10. The actuator of claim 1, wherein the SMA torque tube defines an inner surface and an outer surface, and further wherein the elongate surface of the SMA torque tube includes at least one of:
(i) the inner surface; and
(ii) the outer surface.

11. The actuator of claim 1, wherein the shape memory alloy actuator further includes a thermal sensor configured to detect a temperature of the SMA torque tube, wherein the thermal sensor is operatively attached to the heat transfer structure, and further wherein the heat transfer structure presses the thermal sensor into mechanical and thermal contact with the elongate surface of the SMA torque tube.

12. An actuated assembly, comprising:
a base structure;
an attached component; and
the shape memory alloy actuator of claim 1, wherein the attached component is operatively attached to the base structure via the shape memory alloy actuator such that actuation of the shape memory alloy actuator produces relative motion between the base structure and the attached component.

13. The assembly of claim 12, wherein the actuated assembly further includes a thermal control assembly configured to regulate a temperature of the SMA torque tube.

14. The assembly of claim 13, wherein the thermal control assembly includes a fluid propulsion system configured to direct a heat transfer fluid stream in thermal contact with the elongate surface of the SMA torque tube and with the heat transfer structure.

15. The assembly of claim 12, wherein the base structure includes one of an aircraft, an airplane, and a helicopter.

16. The assembly of claim 12, wherein the attached component includes one of an actuated component, a landing gear, a flap, an aileron, and a rotor.

17. A method of manufacturing a shape memory alloy actuator, the method comprising:
providing a shape memory alloy (SMA) torque tube that defines a first end, a second end, and an elongate surface extending between the first end and the second end;
providing a heat transfer structure configured to increase heat transfer with the SMA torque tube to increase a rate at which the SMA torque tube transitions between a martensite state and an austenite state;
applying a dimension-modifying force to the heat transfer structure to place the heat transfer structure in a modified-dimensional conformation such that a modified characteristic dimension of the heat transfer structure differs from a natural characteristic dimension of the heat transfer structure prior to application of the dimension-modifying force;
combining the heat transfer structure with the SMA torque tube such that the heat transfer structure extends at least partially between the first end and the second end of the SMA torque tube; and
releasing the dimension-modifying force such that the heat transfer structure transitions to an intermediate conformation in which an intermediate characteristic dimension of the heat transfer structure is between the modified characteristic dimension and the natural characteristic dimension and also such that the heat transfer structure exerts a retention force on the elongate surface of the SMA torque tube to retain the heat transfer structure in mechanical and thermal contact with the elongate surface of the SMA torque tube.

18. The method of claim 17, wherein the applying the dimension-modifying force includes twisting the heat transfer structure about a longitudinal axis thereof.

19. A shape memory alloy actuator, comprising:
a shape memory alloy (SMA) torque tube having a first end, a second end, and an elongate surface extending between the first end and the second end; and
a heat transfer structure configured to increase heat transfer with the SMA torque tube to increase a rate at which the SMA torque tube transitions between a martensite state and an austenite state, wherein the heat transfer structure:
(i) is in mechanical and thermal contact with the elongate surface of the SMA torque tube;
(ii) extends at least partially between the first end and the second end of the SMA torque tube; and
(iii) exerts a retention force on the SMA torque tube that retains the heat transfer structure in mechanical and thermal contact with the elongate surface of the SMA torque tube;
wherein the heat transfer structure includes an elongate conductive body, and further wherein the elongate conductive body defines a conductive heat transfer surface, which is shaped to mechanically and thermally contact the elongate surface of the SMA torque tube, and a convective heat transfer surface, which is shaped for heat transfer with a heat transfer fluid stream, wherein a transverse cross-section of the conductive heat transfer surface is at least substantially linear, and further wherein a transverse cross-section of the convective heat transfer surface is at least one of:
(i) nonlinear;
(ii) arcuate;
(iii) partially circular;
(iv) partially elliptical; and
(v) D-shaped.

20. A shape memory alloy actuator, comprising:
a shape memory alloy (SMA) torque tube having a first end, a second end, and an elongate surface extending between the first end and the second end;
a heat transfer structure configured to increase heat transfer with the SMA torque tube to increase a rate at which the SMA torque tube transitions between a martensite state and an austenite state, wherein the heat transfer structure:

(i) is in mechanical and thermal contact with the elongate surface of the SMA torque tube;
(ii) extends at least partially between the first end and the second end of the SMA torque tube; and
(iii) exerts a retention force on the SMA torque tube that retains the heat transfer structure in mechanical and thermal contact with the elongate surface of the SMA torque tube; and
a thermal sensor configured to detect a temperature of the SMA torque tube, wherein the thermal sensor is operatively attached to the heat transfer structure, and further wherein the heat transfer structure presses the thermal sensor into mechanical and thermal contact with the elongate surface of the SMA torque tube.

21. A shape memory alloy actuator, comprising:
a shape memory alloy (SMA) torque tube having a first end, a second end, and an elongate surface extending between the first end and the second end; and
a heat transfer structure configured to increase heat transfer with the SMA torque tube to increase a rate at which the SMA torque tube transitions between a martensite state and an austenite state, wherein the heat transfer structure:
(i) is at least partially defined by an elongate conductive body;
(ii) is in mechanical and thermal contact with the elongate surface of the SMA torque tube;
(iii) extends at least partially between the first end and the second end of the SMA torque tube;
(iv) exerts a retention force on the SMA torque tube that retains the heat transfer structure in mechanical and thermal contact with the elongate surface of the SMA torque tube;
(v) includes a plurality of surface-contacting regions that mechanically and thermally contacts the elongate surface of the SMA torque tube and applies the retention force to the elongate surface of the SMA torque tube; and
(vi) includes a plurality of projecting regions that projects from the elongate surface of the SMA torque tube, wherein at least a subset of the plurality of projecting regions is operatively attached to the elongate conductive body.

22. An actuated assembly, comprising:
a base structure;
an attached component;
a shape memory alloy actuator including:
(i) a shape memory alloy (SMA) torque tube having a first end, a second end, and an elongate surface extending between the first end and the second end; and
(ii) a heat transfer structure configured to increase heat transfer with the SMA torque tube to increase a rate at which the SMA torque tube transitions between a martensite state and an austenite state, wherein the heat transfer structure:
(a) is in mechanical and thermal contact with the elongate surface of the SMA torque tube;
(b) extends at least partially between the first end and the second end of the SMA torque tube; and
(c) exerts a retention force on the SMA torque tube that retains the heat transfer structure in mechanical and thermal contact with the elongate surface of the SMA torque tube;
wherein the attached component is operatively attached to the base structure via the shape memory alloy actuator such that actuation of the shape memory alloy actuator produces relative motion between the base structure and the attached component;
wherein the actuated assembly further includes a thermal control assembly configured to regulate a temperature of the SMA torque tube; and
wherein the thermal control assembly includes a fluid propulsion system configured to direct a heat transfer fluid stream in thermal contact with the elongate surface of the SMA torque tube and with the heat transfer structure.

* * * * *